United States Patent
Kim

(10) Patent No.: US 7,952,665 B2
(45) Date of Patent: May 31, 2011

(54) SUBSTRATE FOR LCD DEVICE AND METHOD FOR MANUFACTURING THE SAME

(75) Inventor: Jinmahn Kim, Beijing (CN)

(73) Assignee: Beijing Boe Optoelectronis Technoloy Co., Ltd., Beijing (CH)

( * ) Notice: Subject to any disclaimer, the term of this patent is extended or adjusted under 35 U.S.C. 154(b) by 164 days.

(21) Appl. No.: 12/126,006

(22) Filed: May 23, 2008

(65) Prior Publication Data

US 2009/0015773 A1   Jan. 15, 2009

(30) Foreign Application Priority Data

Jul. 12, 2007   (CN) .......................... 2007 1 0118709

(51) Int. Cl.
  *G02F 1/1335*   (2006.01)

(52) U.S. Cl. ...................................................... 349/117

(58) Field of Classification Search ................... 349/117
See application file for complete search history.

(56) References Cited

U.S. PATENT DOCUMENTS

| 2004/0227883 | A1* | 11/2004 | Lee et al. ...................... 349/129 |
| 2005/0072959 | A1* | 4/2005 | Moia et al. ................ 252/299.01 |
| 2007/0145510 | A1* | 6/2007 | Lim ................................ 257/462 |

FOREIGN PATENT DOCUMENTS

| CN | 1707335 A | 12/2005 |
| CN | 1716054 A | 1/2006 |

* cited by examiner

*Primary Examiner* — David Nelms
*Assistant Examiner* — Phu Vu
(74) *Attorney, Agent, or Firm* — Ladas & Parry LLP

(57) ABSTRACT

The present invention provides a substrate for liquid crystal display devices which comprises a substrate body and an alignment film formed on a surface of the substrate body. The alignment film comprises at least two alignment film regions having different alignment characteristics, and neighboring alignment film regions are formed by coating different alignment materials to have the different alignment characteristics.

15 Claims, 2 Drawing Sheets

SUBSTRATE FOR LCD DEVICE AND METHOD FOR MANUFACTURING THE SAME

BACKGROUND

The present invention relates to a substrate for a liquid crystal display (LCD) device and a method for manufacturing the same.

Nowadays, LCD devices are the most widely used flat panel display devices. A LCD device comprises two substrate and liquid crystal layer injected between the two substrates. Each of the two substrates is provided with electrodes capable of generating electric field. Upon generating the electric field by the electrodes, liquid crystal molecules of the liquid crystal layer move and are rotated to a certain orientation, allowing light to pass through the liquid crystal layer with a certain refractive index. On the other hand, the two substrates are further coated with an alignment film on its inner surface, which can pre-tilt the liquid crystal molecules between the two substrates in a certain direction.

The alignment of liquid crystal molecules is very important for display quality of a LCD device, and the resultant alignment of liquid crystal molecules is affected by alignment characteristics such as the depth and the direction angle of the grooves formed in the alignment films. A conventional method for coating an alignment film is to coat alignment material by offset print method. In this method, a roller with one surface coated with alignment material is made to roll over and contact a surface of a substrate to be coated with alignment material, forming a layer of alignment film on the surface of the substrate, and then the alignment film is subject to a rubbing process to form grooves on the surface with certain alignment characteristics.

The substrate has different thicknesses in different regions, that is, steps are formed on the surface of the substrate, which cause the surface of the alignment film not to be planar enough. During forming grooves in the surface of the alignment film by rubbing, a high level portion is subject to a larger friction force, while a low level portion is subject to a smaller friction force. As a result, the part at the higher level is formed with deeper grooves, while the part at a lower level is formed with shallower grooves. The depths of the grooves affect the alignment controlling force of the alignment film, which force is for arranging the liquid crystal molecules in a certain direction. If the alignment controlling force is excessively large, a phenomenon that the liquid crystal molecules are prevented from moving occurs, resulting in a phenomenon of mura. On the other hand, if the alignment controlling force is too small, it cannot arrange the liquid crystal molecules in the certain direction, also resulting in the phenomena of mura, contrast ratio degradation and response readiness. Mura refers to a phenomenon that a part or entirety of an image is not uniform in tone when a LCD device displays the images. When the difference in alignment characteristics caused by a step is more severe, flicker and light leakage may occur. Thus the conventional LCD device embodies defects that greatly affect the display quality of the LCD device, such as non-uniformity in response speed and insufficiency in contrast ratio.

SUMMARY

A substrate for liquid crystal display (LCD) devices is provided according to embodiments of the present invention, comprising a substrate body (for example, a glass or plastic board) and an alignment film formed on a surface of the substrate body. The alignment film comprises at least two alignment film regions having different alignment characteristics, and neighboring alignment film regions are formed by coating different alignment materials to have the different alignment characteristics.

A method for manufacturing a substrate for liquid crystal display (LCD) devices, comprising the steps of:

step 1, providing at least two kinds of alignment materials having different alignment characteristics in at least two jets, respectively;

step 2, locating the at least two jets at positions corresponding to at least two predetermined regions of a surface of a substrate body, respectively;

step 3, coating the alignment materials from the at least two jets to the at least two predetermined regions respectively to form at least two alignment film regions having different alignment characteristics on the surface of the substrate body with the at least two kinds of alignment material having different alignment characteristics; and step 4, performing directional rubbing process in the at least two alignment film regions, respectively, to form the substrate for LCD devices.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENTS

Embodiment 1

Figure 1:
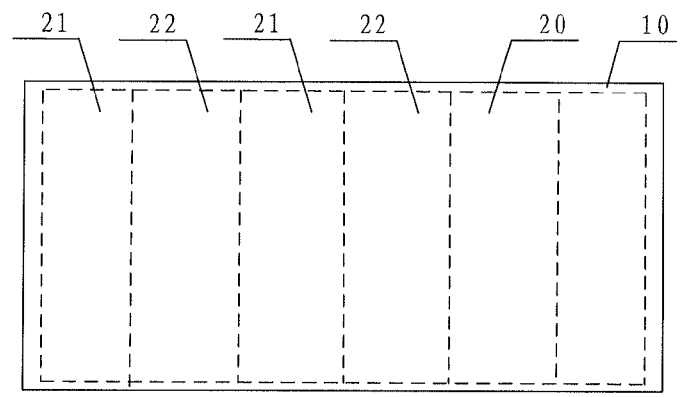
FIG. 1 is a structural schematic diagram of a first embodiment of the present invention.

FIG. 1 is a structural schematic diagram of embodiment 1 of the present invention. As shown in FIG. 1, a substrate for a LCD device comprises a substrate body 10 and an alignment film 20 formed on the substrate body 10. The alignment film 20 comprises first alignment film regions 21 and second alignment film regions 22 which are arranged alternately and have different alignment characteristics. The first alignment film regions 21 and the second alignment film regions 22 are formed by coating different alignment materials respectively, to provide a predetermined pencil hardness difference between the neighboring first alignment film region 21 and second alignment film region 22, so that after a sequential rubbing process, a predetermined alignment angle difference (groove direction angle difference) is generated between the neighboring first alignment film region 21 and the second alignment film region 22.

As compared with the conventional technique in which only one kind of alignment material is coated on the whole surface of the substrate body, the LCD device according to the embodiment of the present invention provides a technical solution in which the alignment film is formed to improve the contrast ratio and the response speed, thereby improving the display quality. In the embodiment of the present invention, by forming alignment film regions of a larger hardness in high level regions and forming alignment film regions of a smaller hardness in low level regions, by forming shallow grooves in alignment film regions of high level and forming deeper grooves in alignment film regions of low level during the formation of grooves in the surface of the alignment film, and at the same time, by keeping the difference between the alignment angles formed in different alignment film regions in a predetermined range, an alignment film is formed comprising alignment film regions having different alignment characteristics. As a result, compared with the conventional technology, weaker alignment controlling force is generated in high level regions to control less liquid crystal, and on the other hand stronger alignment controlling force is generated in low level regions to control more liquid crystal, so that the response rate can be uniform overall.

In addition, forming grooves with a predetermine angle difference can compensate the difference in alignment characteristics caused by the steps, to improve contrast ratio of a LCD device. Further, the above embodiment can also prevent occurrence of light leakage, mura phenomena and so on effectively.

As shown in FIG. 1, alignment film regions can be formed as the first alignment film regions 21 and the second alignment film regions 22 which are strip-like and have a length of more than one pixel unit and a width of one or more pixel units. Two neighboring alignment film regions are formed by coating different alignment materials, respectively, and there is a pencil hardness difference of larger than or equal to 1H and an alignment angle difference of less than or equal to 2° between the neighboring alignment film regions. Preferably, the strip-like alignment film regions formed by coating different alignment materials have a width of one pixel unit, and such alignment strips of different alignment materials are arranged alternately to construct the configuration of the substrate of the present embodiment.

Embodiment 2

Figure 2:
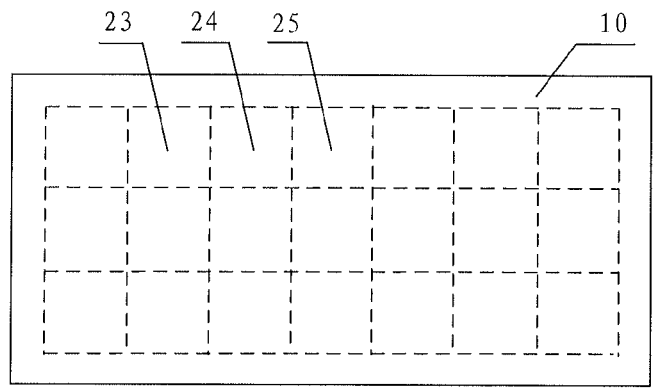
FIG. 2 is a structural schematic diagram of a second embodiment of the present invention.

FIG. 2 is a structural schematic diagram of embodiment 2 of the present invention. As shown in FIG. 2, the alignment film regions can be block-like alignment film regions having a side length of one or more pixel units. Each of the neighboring alignment film regions, for example, a third alignment film region 23, a fourth alignment film region 24 and a fifth alignment film region 25 may be formed of a different alignment material, and each of neighboring alignment film regions may have different alignment characteristics. For example, a specific pencil hardness difference is provided between the neighboring alignment film regions; and a specific alignment angle difference is provided between the neighboring alignment film regions. Alignment film regions with different alignment characteristics, for example, the third alignment film region 23, the fourth alignment film region 24, and the fifth alignment film region 25, are provided on color filter resins of different colors, respectively, and thus alignment film regions with three different alignment characteristics are formed on the surface of the substrate.

As the color filter resins of different colors have different thicknesses according to the colors intended to display, steps are generated among the resins of different colors on the surface of the substrate. In this case, if an alignment film is formed of the same alignment material, then different alignment effects may be generated in high level regions and low level regions, respectively, leading to degradation of display quality of the produced LCD device. Among others, grooves formed in high level regions are relatively deeper, and the alignment controlling force generated in the corresponding high level regions is relatively strong and obstructs liquid crystal molecules from aligning, thus possibly causing phenomenon of mura or decrease of response speed and contrast ratio. On the other hand, grooves formed in low level regions are relatively shallower, and the alignment controlling force generated in corresponding low level regions is relatively weak, which causes liquid crystal molecules align non-uniformly and thus degrades display quality of the produced LCD device.

In embodiment 2, different alignment characteristics are produced in alignment film regions of different levels with different alignment film regions being formed on different color filter resins. A strong alignment controlling force is generated in high level regions, and a weak alignment controlling force is generated in low level regions. Therefore, embodiment 2 of the invention can overcome the defects, such as decrease of contrast ratio and response speed, caused by steps on the surface of the substrate in the conventional LCD device.

In an example of embodiment 2, three kinds of alignment materials are used, an alignment film region formed by coating one of the alignment materials has a side length of one pixel, and alignment film regions formed of different alignment materials are arranged in a staggered and alternating way, so as to form the configuration of the preferred example.

Embodiment 3

Figure 3:
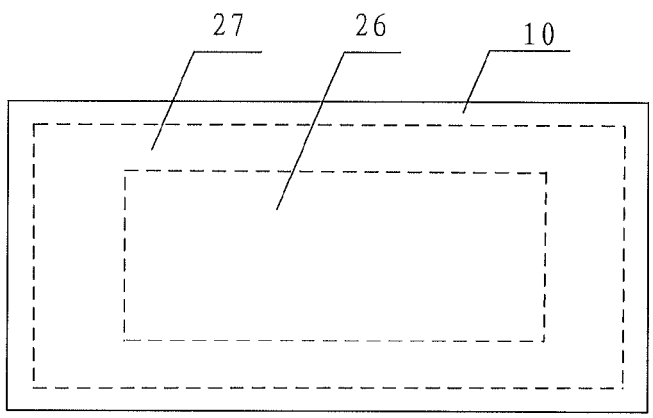
FIG. 3 is a structural schematic diagram of a third embodiment of the present invention.

FIG. 3 is a structural schematic diagram of embodiment 3 of the present invention. As shown in FIG. 3, the alignment film comprises a central alignment film region 26 and a peripheral alignment film region 27 around the central alignment film region 26. The alignment film regions are formed by coating different alignment materials and have different alignment characteristics. An alignment film of a relatively high transmissivity is formed in the central alignment film region 26, and an alignment film of a relatively low transmissivity is formed in the peripheral alignment film region 27.

Due to differences in structure of LCD devices (for example, a peripheral portion is provided with sealant for assembling the substrates to form a panel, while a central portion is not), the central alignment film region 26 and the peripheral alignment film region 27 have different optical characteristics, and for example, the brightness is relatively high in the peripheral alignment film region 27, but relatively low in the central alignment film region 26.

According to embodiment 3, by forming a central alignment film region of a relatively high transmissivity and forming a peripheral alignment film region of a relatively low transmissivity, brightness in the central region and the peripheral region can be adjusted to be uniform across the assembled display panel, so that the display quality of a LCD device can be improved efficiently.

In embodiment 3, there may be provided a plurality of peripheral alignment film regions on the substrate as necessary.

In the above described embodiments, an alignment film can be formed by a preparation of a base material such as polyimide and an adding the mixture comprising tri-chloro-anisole (TCA), chloride benzene (CB), and the like into the base material with a certain mole percentages, wherein the alignment characteristics of the alignment film, such as hardness, alignment angle, depth of a groove, and transmissivity, can be adjusted by varying the mole percentages of the mixture components or by mixing different alignment materials.

In the above discussed three embodiments, preferably, the alignment materials used render a pencil hardness difference between two neighboring alignment film regions larger than or equal to 1H and an alignment angle difference between two neighboring alignment film regions less than or equal to 2°. Pencil hardness can be measured by using a well-known method in the art for measuring pencil hardness of a coated film, for example, the method specified in accordance with GB6739-86 of Chinese national standard.

Further, the above discussed three embodiments, the substrate may comprise a color filter resin layer on a substrate body, and alignment film regions with difference alignment characteristics are provided on the resins of different colors. The substrate can be an array substrate or a color filter substrate, or it can be a color filter on array (COA) substrate or the like, as long as the substrate is coated with alignment film to pre-align a liquid crystal layer for displaying images.

Embodiment 4

Figure 4:
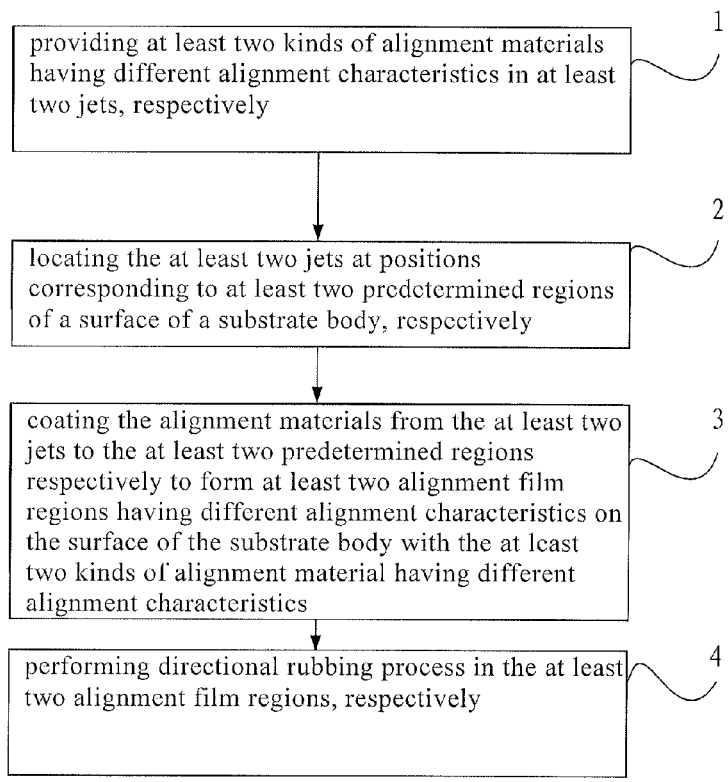
FIG. 4 is a flow chart of a method for manufacturing a substrate of a LCD device of an embodiment of the present invention.

FIG. 4 is a flow chart of a manufacturing method of a liquid crystal display substrate according to an embodiment of the present invention. The method may comprises the following steps of:

step 1, providing at least two kinds of alignment materials having different alignment characteristics in at least two jets, respectively;

step 2, locating the at least two jets at positions corresponding to at least two predetermined regions of a surface of a substrate body, respectively;

step 3, coating the alignment materials from the at least two jets to the at least two predetermined regions respectively to form at least two alignment film regions having different alignment characteristics on the surface of the substrate body with the at least two kinds of alignment material having different alignment characteristics; and step 4, performing directional rubbing process in the at least two alignment film regions, respectively.

In the method for manufacturing a LCD device according to an embodiment of the present invention, an alignment film is formed to eliminate non-uniformity of response speed and improve contrast ratio. By forming alignment film regions of a larger hardness in high level regions and forming alignment film regions of a smaller hardness in low level regions through at least two jets provided with alignment materials having different alignment characteristics, by forming shallow grooves in the alignment film regions of high level and forming deeper grooves in the alignment film regions of low level during rubbing the alignment film with a roller, and by forming an alignment angle difference between the neighboring different alignment film regions in a predetermined range, the alignment film is formed to comprise alignment film regions having different alignment characteristics.

As a result, compared with the conventional substrate, weaker alignment controlling force is generated in high level regions to control relatively less liquid crystal, and stronger alignment controlling force is generated in low level regions to control relatively more liquid crystal, so that the response effect is uniform overall.

Forming grooves with an alignment angle difference can compensate the difference in alignment characteristics caused by the steps on the surface to improve contrast ratio of a LCD device. Further, a LCD device according to the above discussed Embodiment 4 can prevent occurrence of light leakage and mura phenomena effectively.

Further, in embodiment 4, the pencil hardness difference of the neighboring formed alignment film regions is larger than or equal to 1H; the alignment angle difference of the formed alignment film regions is less than or equal to 2°. Furthermore, the formed alignment film regions can be block-like alignment film regions having a side length of one or more pixel units, or strip-like alignment film regions having a length of more than one pixel units and a width of one or more pixel units.

Figure 5:
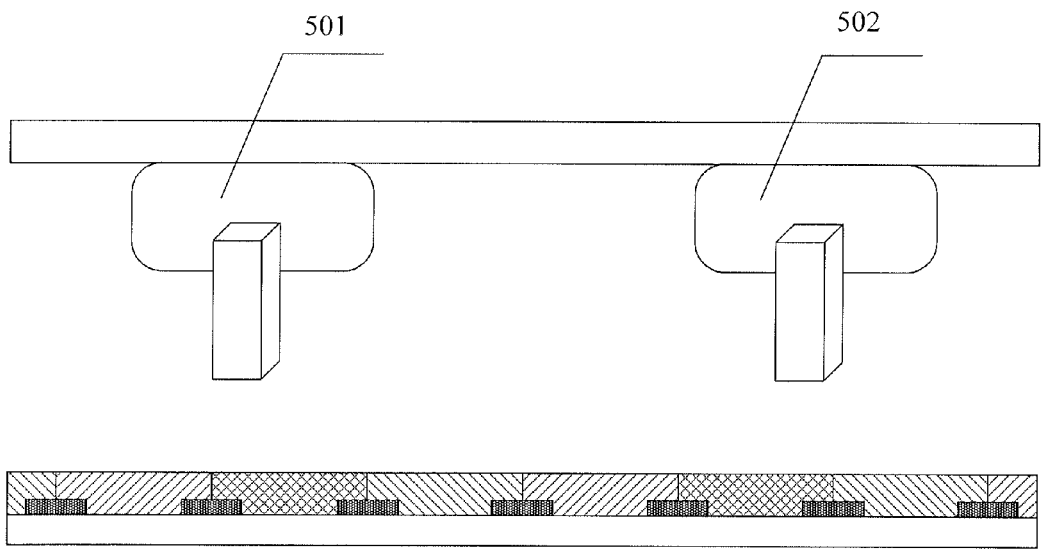
FIG. 5 is a structural schematic diagram of a nozzle of an embodiment of the present invention.

FIG. 5 is a structural schematic diagram according to an embodiment of the present invention. A first jet 501 and a second jet 502 are provided side by side and are provided with different alignment materials having different alignment characteristics, respectively. The first jet and the second jet are moved to the positions corresponding to the predetermined regions of the surface of the substrate to be coated with the alignment materials, and then the jets coat the two kinds of alignment materials to the surface of the substrate respectively or simultaneously, to form two alignment film regions by coating the two kinds of alignment materials with a different in pencil hardness of larger than or equal to 1H between the two alignment film regions. Then, a first jet 501 and a second jet 502 are moved to other positions corresponding to other predetermined regions, and the above processes are repeated so as to form an alignment film comprising two alignment film regions having different alignment characteristics finally. As required, the jets may be more than two, and the alignment materials may be more than two kinds, so as to form at least two alignment film regions having different alignment characteristics.

Further, in a method according to another embodiment of the present invention, the predetermined regions may be block-like alignment film regions having a side length of one or more pixel units, or strip-like alignment film regions having a length of more than one pixel units and a width of one or more pixel units, preferably, block-like alignment film regions having a side length of one pixel unit.

The embodiments of the invention being thus described, it will be obvious that the same may be varied in many ways. Such variations are not to be regarded as a departure from the spirit and scope of the invention, and all such modifications as would be obvious to those skilled in the art are intended to be comprised within the scope of the following claims.

What is claimed is:

1. A substrate for liquid crystal display (LCD) devices comprising a substrate body and an alignment film formed on a surface of the substrate body wherein the alignment film comprises at least two alignment film regions having different alignment characteristics, and neighboring alignment film regions are formed by coating different alignment materials to have the different alignment characteristics; and wherein shallow grooves are formed in the alignment region of a larger hardness and deep grooves are formed in the alignment film region of a smaller hardness, wherein the alignment film region of a larger hardness if formed in the high level region and the alignment film region of a smaller hardness if formed in a low level region.

2. The substrate for LCD devices of claim 1, wherein a pencil hardness difference between the at least two alignment film regions having different alignment characteristics is larger than or equal to 1H.

3. The substrate for LCD devices of claim 1, wherein an alignment angle difference between the at least two alignment film regions having different alignment characteristics is less than or equal to 2°.

4. The substrate for LCD devices of claim 1, wherein the alignment film regions are block-like alignment film regions having a side length of one or more pixel units.

5. The substrate for LCD devices of claim 1, wherein the alignment film regions are strip-like alignment film regions having a length of more than one pixel unit and a width of one or more pixel units.

6. The substrate for LCD devices of claim 1, wherein the alignment film regions comprises a central alignment film region and at least one peripheral alignment film region.

7. The substrate for LCD devices of claim 1, wherein the substrate is selected from the group consisting of an array substrate, a color filter substrate, and a color filter on array substrate.

8. The substrate for LCD devices of claim 1, further comprising color filter resin layers formed on the substrate body, wherein the alignment film regions having different alignment characteristics are provided on color filter resin layers of different colors, respectively.

9. A method for manufacturing a substrate for liquid crystal display (LCD) devices, comprising the steps of:
    step 1, providing at least two kinds of alignment materials having different alignment characteristics in at least two jets, respectively;
    step 2, locating the at least two jets at positions corresponding to at least two predetermined regions of a surface of a substrate body, respectively;
    step 3, coating the alignment materials from the at least two jets to the at least two predetermined regions respectively to form at least two alignment film regions having different alignment characteristics on the surface of the substrate body with the at least two kinds of alignment material having different alignment characteristics; and
    step 4, performing directional rubbing process in the at least two alignment film regions, respectively, to form the substrate for LCD devices;
    wherein shallow grooves are formed in the alignment film region of a larger hardness and deep grooves are formed in the alignment film region of a smaller hardness, wherein the alignment film region of a larger hardness is formed in a high level region and the alignment film region of a smaller hardness is formed in a low level region.

10. The method of claim 9, wherein a pencil hardness difference between the at least two alignment film regions is larger than or equal to 1H.

11. The method of claim 9, wherein an alignment angle difference between the at least two alignment film regions is less than or equal to 2°.

12. The method of claim 9, wherein the predetermined regions are block-like alignment film regions having a side length of one or more pixel units.

13. The method of claim 9, wherein the predetermined regions are strip-like alignment film regions having a length of more than one pixel unit and a width of one or more pixel units.

14. The method of claim 9, wherein the formed substrate is selected from the group consisting of an array substrate, a color filter substrate, and a color filter on array substrate.

15. The method of claim 9, wherein the formed substrate comprises color filter resin layers, and the least two alignment film regions are provided on the color filter resin layers of different colors.

* * * * *

UNITED STATES PATENT AND TRADEMARK OFFICE
CERTIFICATE OF CORRECTION

| | | |
|---|---|---|
| PATENT NO. | : 7,952,665 B2 | Page 1 of 1 |
| APPLICATION NO. | : 12/126006 | |
| DATED | : May 3, 2011 | |
| INVENTOR(S) | : Jinmahn Kim | |

It is certified that error appears in the above-identified patent and that said Letters Patent is hereby corrected as shown below:

TITLE PAGE, ITEM (73)

Correct the Assignee's name from Beijing Boe Optoelectronis Technology Co., Ltd., (CH) to
<u>Beijing Boe Optoelectronics Co., Ltd., Beijing (CN)</u>

Signed and Sealed this
Fourth Day of October, 2011

David J. Kappos
*Director of the United States Patent and Trademark Office*

UNITED STATES PATENT AND TRADEMARK OFFICE
CERTIFICATE OF CORRECTION

PATENT NO.         : 7,952,665 B2
APPLICATION NO.    : 12/126006
DATED              : May 3, 2011
INVENTOR(S)        : Jinmahn Kim It is certified that error appears in the above-identified patent and that said Letters Patent is hereby corrected as shown below:

TITLE PAGE, ITEM (73)

Correct the Assignee's name from Beijing Boe Optoelectronis Technology Co., Ltd., (CH) to
<u>Beijing Boe Optoelectronics Technology Co., Ltd., Beijing (CN)</u>

This certificate supersedes the Certificate of Correction issued October 4, 2011.

Signed and Sealed this
Third Day of January, 2012

David J. Kappos
*Director of the United States Patent and Trademark Office*